(12) United States Patent
Rudkowski et al.

(10) Patent No.: US 12,083,983 B2
(45) Date of Patent: Sep. 10, 2024

(54) PASSENGER AIRBAG MODULE WITH TRANSVERSE TETHER

(71) Applicant: Autoliv Development AB, Vargarda (SE)

(72) Inventors: Radoslaw Rudkowski, Dolnoslaskie (PL); Karolina Lukasik, Dolnoslaskie (PL); Martyna Maciejewska, Olawa (PL); Daria Michalowicz, Olawa (PL); Agnieszka Bobryk, Olawa (PL)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/058,533

(22) Filed: Nov. 23, 2022

(65) Prior Publication Data
US 2023/0166684 A1    Jun. 1, 2023

(30) Foreign Application Priority Data
Dec. 1, 2021   (DE) .......................... 102021131570.0

(51) Int. Cl.
*B60R 21/2338* (2011.01)
*B60R 21/205* (2011.01)

(52) U.S. Cl.
CPC ........ *B60R 21/2338* (2013.01); *B60R 21/205* (2013.01); *B60R 2021/23386* (2013.01)

(58) Field of Classification Search
CPC .............. B60R 21/2338; B60R 21/205; B60R 2021/23386
See application file for complete search history.

(56) References Cited

U.S. PATENT DOCUMENTS

| | | | |
|---|---|---|---|
| 5,609,363 A | 3/1997 | Finelli | |
| 6,846,008 B2 * | 1/2005 | Kamiji | B60R 21/231 280/729 |
| 6,962,363 B2 * | 11/2005 | Wang | B60R 21/2338 280/739 |
| 7,607,689 B2 * | 10/2009 | Kalczynski | B60R 21/2338 280/739 |
| 7,954,850 B2 * | 6/2011 | Fischer | B60R 21/2338 280/739 |
| 8,596,680 B2 * | 12/2013 | Kim | B60R 21/2338 280/743.2 |

(Continued)

FOREIGN PATENT DOCUMENTS

EP     3202627 A1     8/2017
JP     2003081047 A  *  3/2003

*Primary Examiner* — Jason D Shanske
*Assistant Examiner* — Joselynn Y Sliteris
(74) *Attorney, Agent, or Firm* — Foley & Lardner LLP

(57) ABSTRACT

A passenger airbag module is described. This passenger airbag module comprises an airbag cushion having an outer skin enclosing a chamber, a structural member comprising a housing into which the un-deployed airbag cushion is folded, and an inflator. The housing extends in transverse direction from a first end to a second end, and the fully deployed outer skin extends in the transverse direction from a third end to a fourth end. In order to improve the positioning of the deployed airbag, a transverse tether is provided. This transverse tether extends from a fifth end being connected to the outer skin in transverse direction to a sixth end being connected to at least one of the outer skin and the structural member.

11 Claims, 4 Drawing Sheets

(56) References Cited

U.S. PATENT DOCUMENTS

| | | | |
|---|---|---|---|
| 8,684,400 B2* | 4/2014 | Picard | B60R 21/2338 |
| | | | 280/743.2 |
| 9,352,839 B2* | 5/2016 | Gehret | B64D 11/06205 |
| 9,358,945 B2* | 6/2016 | Yamada | B60R 21/263 |
| 9,428,139 B2* | 8/2016 | Yamada | B60R 21/268 |
| 9,434,343 B2* | 9/2016 | Motomochi | B60R 21/231 |
| 9,505,372 B2* | 11/2016 | Yamada | B60R 21/205 |
| 9,669,793 B2* | 6/2017 | Jung | B60R 21/237 |
| 9,707,921 B2* | 7/2017 | Fischer | B60R 21/213 |
| 9,758,123 B2* | 9/2017 | Yamada | B60R 21/2338 |
| 9,796,354 B1* | 10/2017 | Hayashi | B60R 21/239 |
| 10,023,144 B2* | 7/2018 | Taguchi | B60R 21/2338 |
| 10,214,174 B2* | 2/2019 | Zhang | B60R 21/205 |
| 10,259,418 B2* | 4/2019 | Schuler | B60R 21/237 |
| 10,293,779 B2* | 5/2019 | Mallinger | B60R 21/205 |
| 10,358,106 B2* | 7/2019 | Sumiya | B60R 21/205 |
| 10,464,519 B2* | 11/2019 | Kim | B60R 21/231 |
| 10,525,927 B2* | 1/2020 | Fischer | B60R 21/231 |
| 10,632,956 B2* | 4/2020 | Schneider | B60R 21/207 |
| 2013/0055942 A1* | 3/2013 | Sekino | B60R 21/231 |
| | | | 112/475.08 |
| 2023/0132711 A1* | 5/2023 | Nakanishi | B60R 21/216 |
| | | | 280/728.3 |

* cited by examiner

PASSENGER AIRBAG MODULE WITH TRANSVERSE TETHER

CROSS-REFERENCE TO RELATED APPLICATIONS

This application claims priority pursuant to 35 U.S.C. 119(a) to German Application No. 102021131570.0, filed Dec. 1, 2021, which application is incorporated herein by reference in its entirety.

FIELD

The invention relates to a passenger airbag module according to the preamble of claim 1 and to a vehicle comprising a dashboard and such a passenger airbag module according to claim 9.

BACKGROUND

A so called passenger airbag module is a part of almost every modern passenger car and constitutes—together with the seat belt—the essential safety feature for protecting the passenger (the person sitting next to the driver), especially in case of a frontal accident.

As every airbag module such a passenger airbag module comprises an airbag cushion having an outer skin which encloses a chamber filled by inflation gas being discharged from an inflator. In most cases the airbag cushion is assigned to only one person because in a usual passenger car only one seat is provided next to the driver. But of course also vehicles are known which provide more than one seat next to the driver, or a seat bench adapted for two or even three front seated passengers.

It is known to provide a single passenger airbag module with a single airbag cushion for all front seated passengers of a vehicle providing room for two front-seated passengers, such that an accordingly large airbag cushion is needed. The depth of the outer skin of such an airbag cushion can essentially be the same as in the case of an airbag cushion being assigned to only one passenger, but the dimension in the transvers direction of the vehicle is of course substantially larger than in the case of an airbag cushion being adapted to only one passenger.

Starting from this prior art it is an object of the invention to improve a generic passenger airbag module, especially in such a way that the positioning of the airbag cushion is improved.

This task is solved by a passenger airbag module having the features of claim 1. A vehicle comprising such a passenger airbag module is defined in claim 9.

SUMMARY

A passenger airbag module as known in the prior art is attached to the instrument panel only via a structural member comprising a housing. This means that, in case of an airbag cushion being allocated to more than one passenger, at least one lateral end of the fully deployed outer skin is in transverse direction relatively far remote from the nearest attachment point of the airbag cushion to the structural member. This is especially the case if the housing is—in transverse direction—not located in the center of the outer skin (which is often preferred). It has been observed that due to the relative large distance at least one lateral end of the outer skin of the airbag tends to move downwards due to the gravity acting on the airbag cushion after the outer skin has been fully deployed. So it can happen that the outer skin of the airbag cushion (and especially its impact surface) is not in its ideal position anymore when the passenger (especially the passenger sitting at the outside, remote from the driver) hits the impact surface of the outer skin.

So it has been searched for possibilities how this moving down of at least one lateral end of the outer skin of the airbag can be prevented.

It has been found out that the problem can be solved with remarkably simple means, namely by providing a transverse tether which is connected to the outer skin at or near the lateral end of the airbag skin that needs to be prevented from falling down, and that extends in transverse direction to an end that is connected to at least one of the outer skin and the structural member.

Such a tether is extremely easy to manufacture and to assemble, and does not substantially enlarge the weight or packing space of the airbag module.

In order to prevent an interference of the transverse tether with other tethers that might be necessary for shaping the outer skin, it is preferred that the transverse tether is located outside the chamber enclosed by the outer skin.

The transverse tether should of course also not interfere with the person or persons to be protected, it preferably extends along a support surface of the airbag cushion, especially in such a way that it abuts this support surface along its entire length when the airbag is fully deployed. Often it will be preferred that the transverse tether extends substantially only in the transverse direction.

The transverse tether works best if it extends along the support surface of the outer skin, remote from the impact surface of the outer skin, especially along an area of the support surface that points towards an upper area of the instrument panel and/or the windscreen.

Although not necessary from a functional point of view, is usually preferred that both ends of the transverse tether are connected to the outer skin because that makes the manufacturing process very easy.

The transverse tether works best if it is relatively long in relation to the transverse dimension of the outer skin of the airbag and thus is preferred if it extends in transverse direction at least 50%, preferably at least 70%, more preferably at least 80% of the width of the deployed outer skin.

As has been mentioned, passenger airbag modules are often asymmetric in such a way that one end of the fully deployed outer skin is closer to the housing than the other end of the outer skin. The invention is especially useful for such asymmetric airbag modules, namely for positioning the end of the airbag skin that is remote from the housing.

As has been mentioned, the invention is especially useful for an airbag module with a large airbag cushion whose fully deployed outer skin encloses a volume of at least 100 litres, preferably of at least 150 litres.

BRIEF DESCRIPTION OF THE FIGURES

The invention will now be described in more detail by means of an embodiment in view of the figures. The figures show.

DETAILED DESCRIPTION

Figure 1:
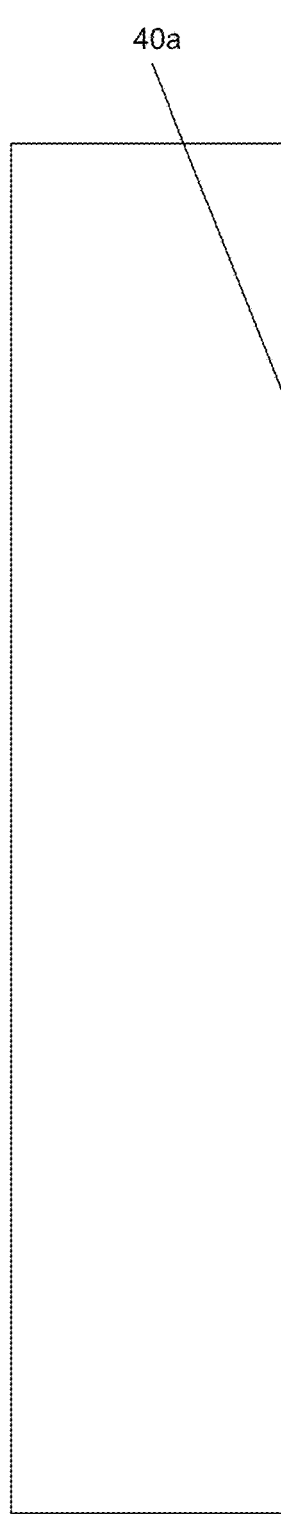
FIG. 1 a simplified representation of the cuttings of an airbag cushion, a transverse tether and a housing-inflator-unit, FIG. 2 the passenger airbag module being made from the items shown in FIG. 1 in a state in which the outer skin of the airbag cushion is fully deployed, FIG. 3 the airbag cushion and the outer tether shown in FIG. 2 in a state in which the passenger airbag module is mounted to the dashboard of a vehicle in a schematic view from the side, FIG. 4 the front of a vehicle as shown in FIG. 3 in a plane view from direction R in FIG. 3, FIG. 5 a variation to the embodiment shown in FIG. 4, and FIG. 6 a second embodiment of the airbag module in a representation according to FIG. 3.
Figure 1:
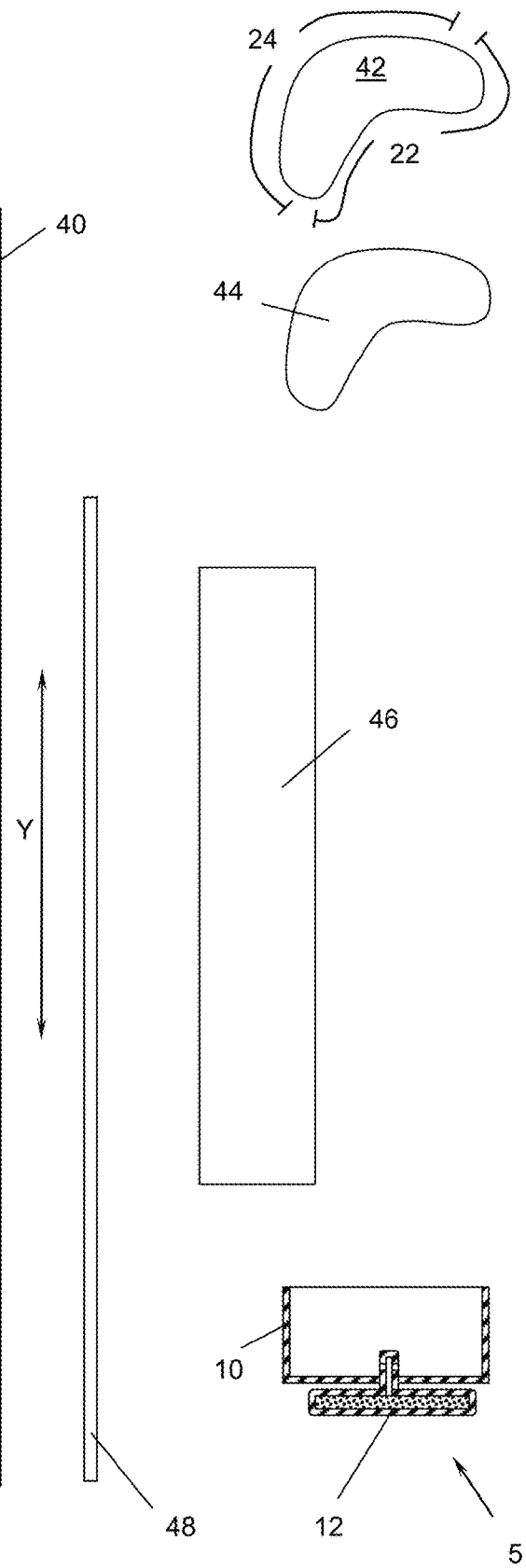

FIG. 1 shows—very schematically—all elements from which the described embodiment of the inventive passenger airbag module is made.

The passenger airbag module comprises a housing-inflator-unit 5 having a housing 10 and an inflator 12 (here in form of a so-called submarine inflator, but of course any sort of inflator can be used). Further, the passenger airbag module of course comprises an airbag cushion having an outer skin. In this connection it needs to be emphasized that the airbag cushion could comprise additional elements like inner tethers, gas distribution elements and the like, but since such elements are not relevant for understanding the invention, they are not shown here. As a consequence, the airbag cushion of the shown embodiment consists exclusively of its outer skin. The outer skin is made from four cuttings, namely a cutting 40 for the jacket of the outer skin, two cuttings 42 and 44 for the face sides of the outer skin and one cutting 46 for a mouth-piece of the outer skin. The cutting 40 for the jacket is basically rectangular and shows a hole 40a. Around this hole 40a the cutting 46 for the mouth-piece is sewn, such that a mouth-piece adapted for being attached to the housing inflator unit 5 is created. In other embodiments, such a mouth-piece might not be necessary.

The cuttings 42, 44 for the face sides are essentially "kidney-shaped" and define the shape of the jacket when the outer skin is fully deployed such that the outer surface of the jacket can be looked at as being comprised of an impact surface 24 and a support surface 22, as is schematically indicated.

Finally, a transverse tether 48 is provided. As can be seen from FIG. 1, the length of the transverse tether 48 in transverse direction Y is more than half of the length of the cutting 40 for the jacket in this direction.

All cuttings 40, 42, and 46 as well as the transverse tether can be made from the same standard airbag material (usually woven plastic).

Figure 2:
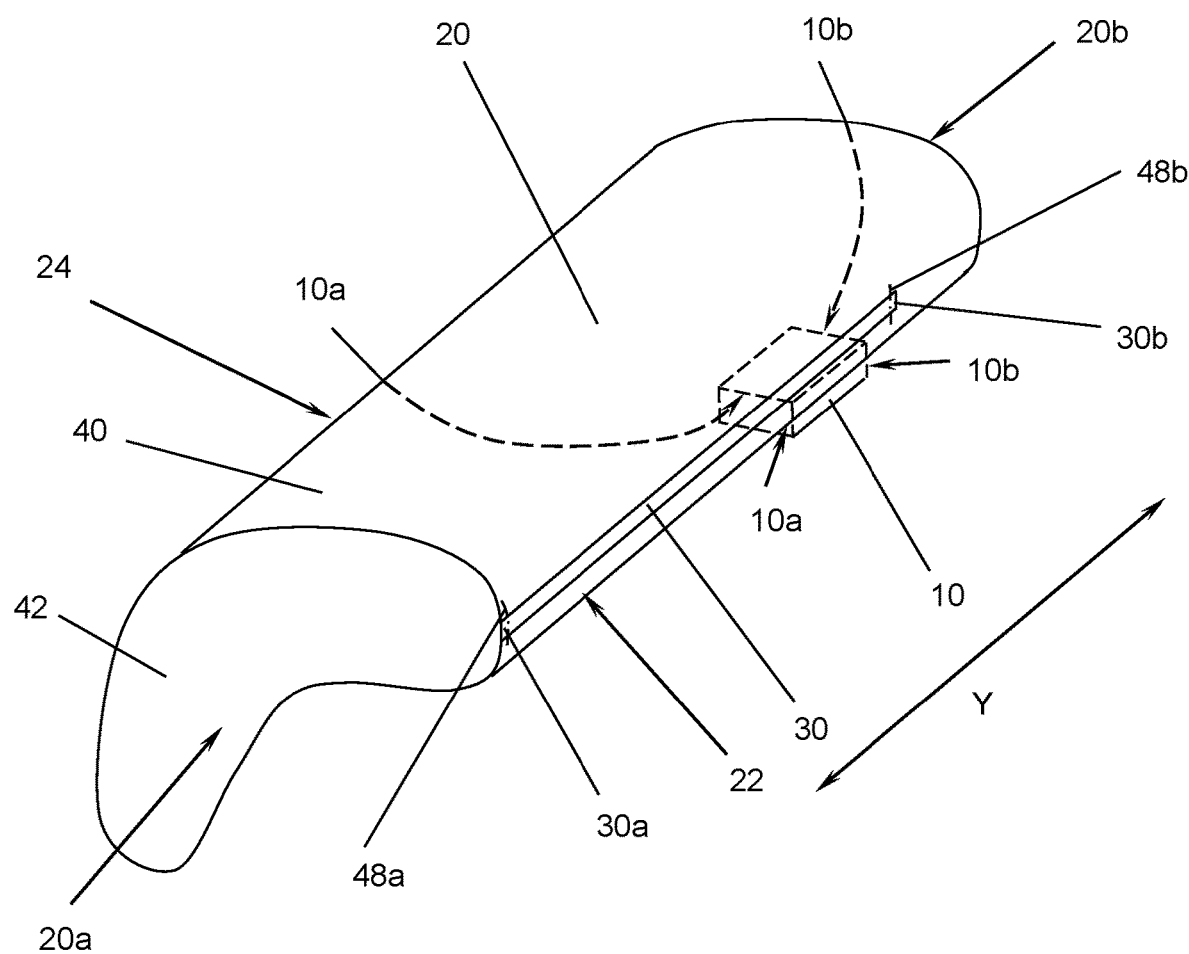

FIG. 2 shows schematically the passenger airbag module being made from the elements shown in FIG. 1 in a state in which the outer skin 20 is fully deployed.

In transverse direction Y, the housing 10 extends from a first end 10a to a second end 10b and the outer skin 20 extends from a third end 20a (which is formed by the cutting 42 of the first side face) to a fourth end 20b (which is formed by the cutting 44 of the second face). Because of the position of the hole 40a, the housing 10 is not arranged in the middle between the third end 20a and the fourth end 20b; it is closer to the fourth end 20b of the outer skin 20 than to the third end 20a of the outer skin.

The transverse tether 30 extends (as its name says) also along the transverse direction Y from its fifth 30a to its sixth end 30b. It is essential that the fifth end 30a is attached to the outer skin 20—usually by a seam 48a—at or close to (again in transverse direction Y) the third end 20a of the outer skin 20. In the embodiment shown, the sixth end 30b of the transverse tether 30 is also attached to the outer skin, but at least in principle it would also be possible that this sixth end 30b is attached to the housing or another structural member. In the embodiment shown, the transverse tether extends substantially to the Y-position of the second end 10b of the housing, but it could also extend farer towards the second end 20b of the outer skin 20, or less far, for example to the Y-position of the first end 10a of the housing 10. The transverse tether 30 is located on the outside of the outer skin 20 and extends preferably along a section of the support surface 22, such that it does not interfere with the passenger to be protected.

Figure 3:
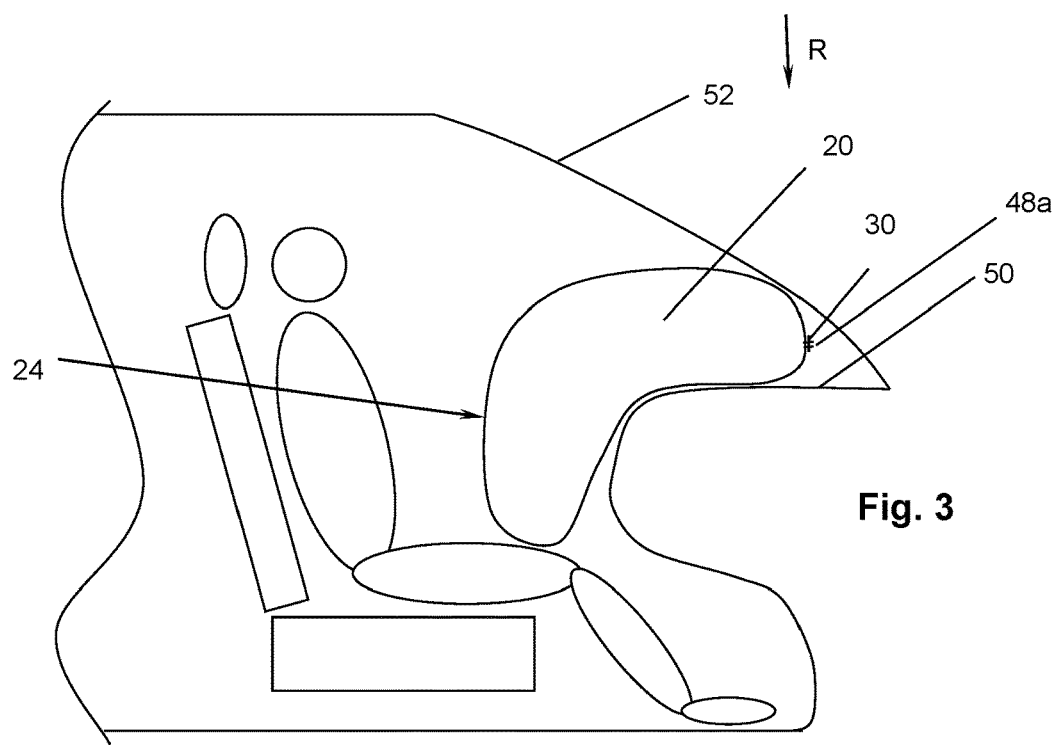
Figure 4:
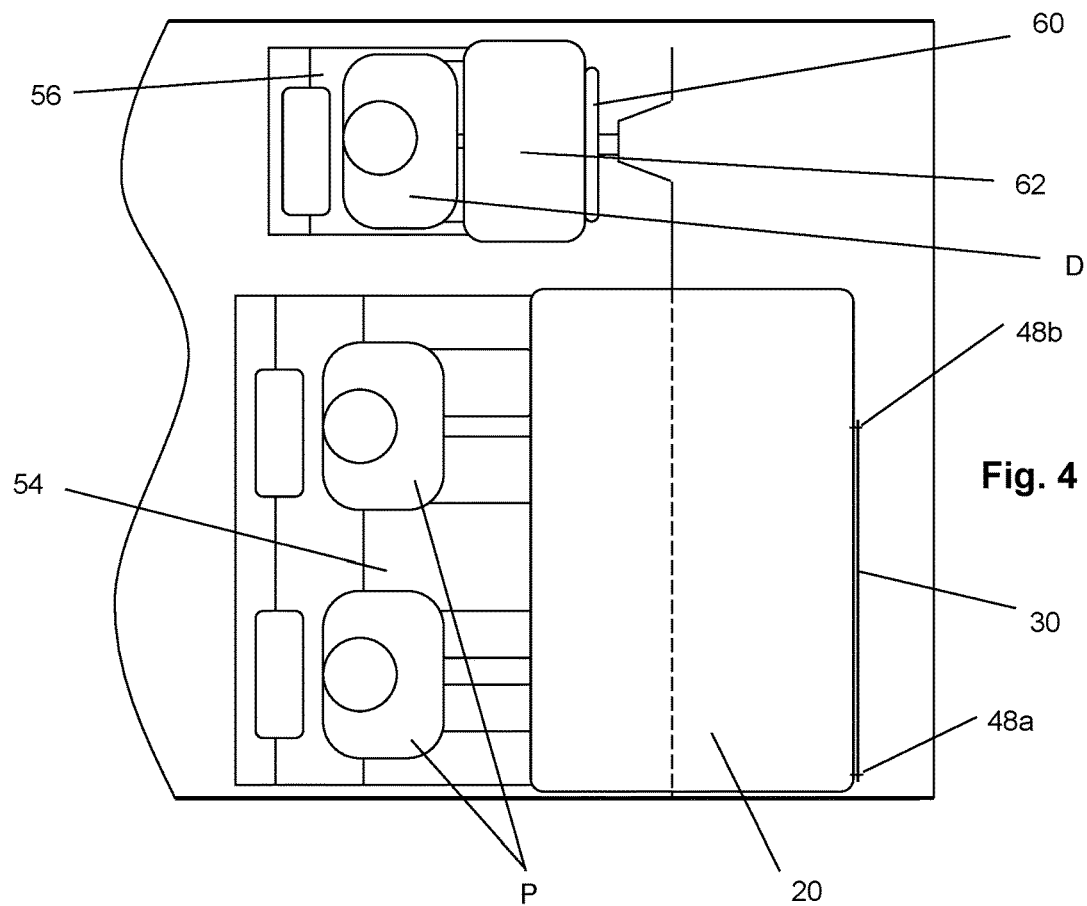

FIGS. 3 and 4 show the airbag module of FIG. 2 being installed in a passenger car having a driver's seat 56, a driver airbag 62, a steering wheel 60, and a bench 54. One can see that the transverse tether 30 does not interfere with the passengers P to be protected but helps to keep the third end 30a in its vertical position after the airbag cushion has been fully deployed such that it does not move downward due to gravity. For this purpose it is optimal if the transverse tether is under slight tension when the outer skin is fully deployed.

Figure 5:
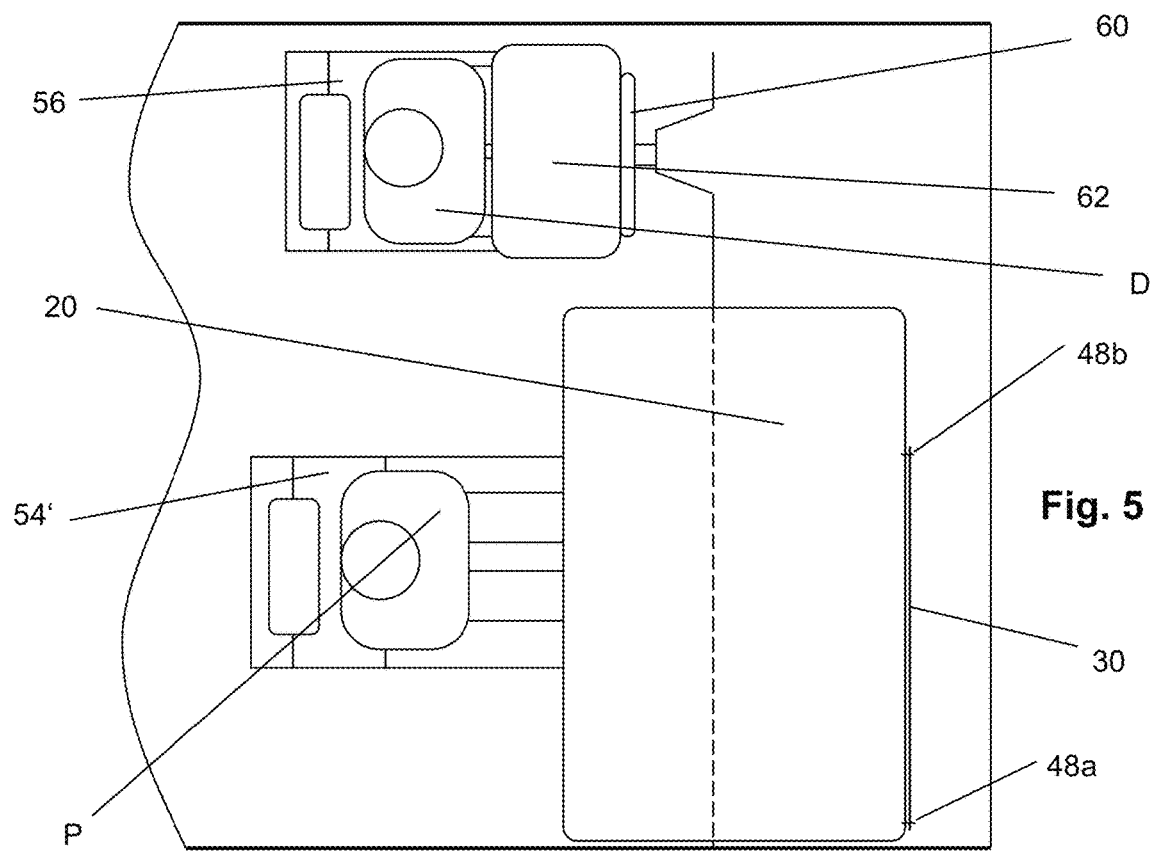

As is shown in FIG. 5, it also possible to use the airbag module according to the invention in case that the vehicle has a single passenger's seat 54' instead of a bench 54. Often, the same vehicle is sold in versions with a single passenger's seat and in versions with a bench and it is preferred to use the same passenger frontal airbag module in both versions. In case of a single passenger's seat the large airbag cushion has the additional advantage that it might provide even better protection in case of a laterally offset frontal crash (so-called oblique crash scenario), especially if the passenger is not belted.

Figure 6:
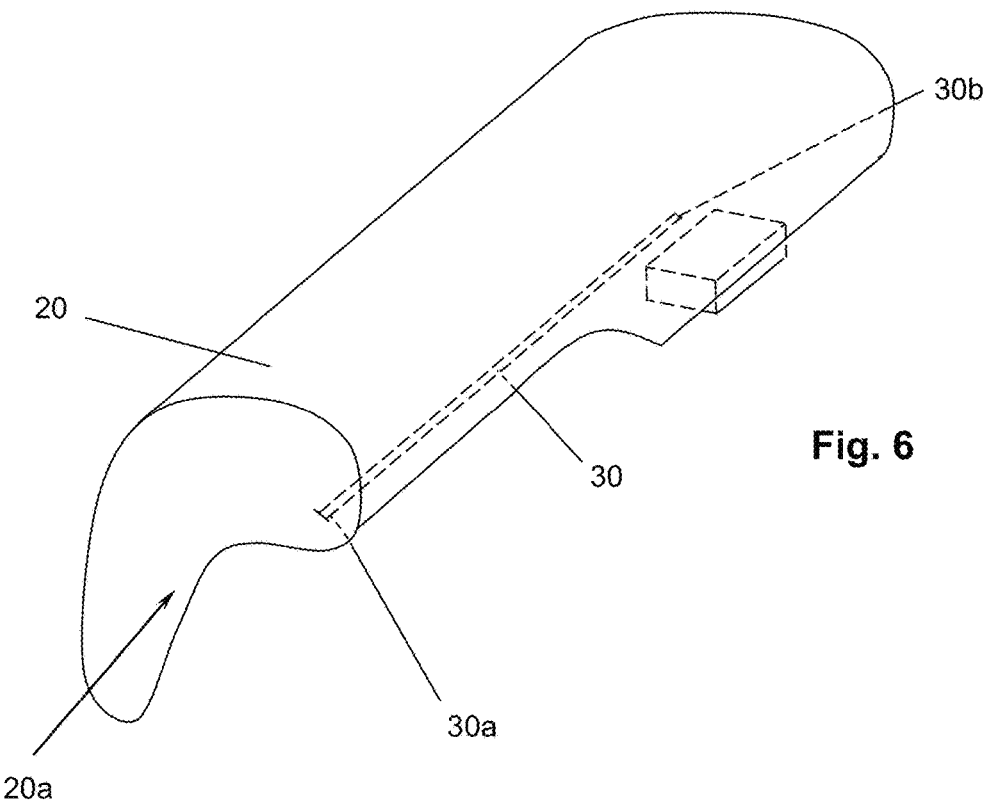

FIG. 6 shows an embodiment in which the transverse tether is located along an area of the support surface 22 that points essentially downwards when the outer skin 20 of the airbag cushion is fully deployed.

LIST OF REFERENCE NUMBERS 5 housing-inflator-unit
10 housing
10a first end
10b second end
12 inflator
20 outer skin of airbag cushion
20a third end
20b fourth end
22 support surface
24 impact surface
30 transverse tether
30a fifth end
30b sixth end
40 cutting for jacket of outer skin
40a hole in cutting for jacket
42 cutting for first face side of outer skin (forming the third end)
44 cutting for second face side of outer skin (forming the fourth end)
46 cutting for mouth-piece of outer skin
48 transverse tether
48a, 48b seam connecting the tether to the outer skin
50 instrument panel
52 windshield
54 bench
54' passenger's seat
56 driver's seat
D driver
P passenger

What is claimed is:

1. A passenger airbag module comprising:
an airbag cushion comprising an outer skin and side panels enclosing a chamber, the side panels defining a shape of the airbag cushion when the airbag cushion is fully deployed, the side panels each having a horizontal portion and a vertical portion substantially perpendicular to the horizontal portion such that the outer skin when fully deployed has a first portion extending in a horizontal direction and a second portion extending from a distal end of the first portion in a vertical direction substantially perpendicular to the horizontal direction, the first portion including a proximal end adjacent a housing and the distal end which is farther from the housing than the proximal end,
a structural member comprising the housing into which the airbag cushion is folded when the airbag cushion is in a resting state, said structural member being adapted for being mounted to a dashboard of a vehicle, and said housing extending in a transverse direction from a first end to a second end,
an inflator in fluid communication to the chamber,
wherein the fully deployed outer skin extends in the transverse direction from a third end to a fourth end, and
wherein a transverse tether is provided outside the chamber, said transverse tether extending from a fifth end connected to the outer skin substantially only in the transverse direction to a sixth end connected to at least one of the outer skin and the structural member, and wherein the transverse tether abuts a downward-facing external surface of the first portion of the fully deployed outer skin along an entire length of the transverse tether.

2. The passenger airbag module of claim 1, wherein the transverse tether is remote from an impact surface of the outer skin.

3. The passenger airbag module according of claim 1, characterized in that the sixth end is connected to the outer skin.

4. The passenger airbag module of claim 1, wherein the transverse tether extends in transverse direction at least 50% of the width of the deployed outer skin, the width of the deployed outer skin being defined by the distance between the third end and the fourth end.

5. The passenger airbag module of claim 1, wherein the passenger airbag module is asymmetric in such a way that the fourth end of the fully deployed outer skin is closer to the second end of the housing than the third end of the fully deployed outer skin to the first end of the housing.

6. The passenger airbag module of claim 1, wherein the fifth end of the transverse tether is connected to the third end of the outer skin.

7. The passenger airbag module of claim 1, wherein the chamber enclosed by the fully deployed outer skin has a volume of at least 100 litres.

8. The passenger airbag module of claim 1, wherein the sixth end is connected to the structural member.

9. A vehicle comprising a dashboard and the passenger airbag module of claim 1 mounted to the dashboard.

10. The vehicle of claim 9, wherein the transverse tether extends along a support surface of the outer skin, remote from an impact surface of the outer skin and wherein the transverse tether is located between the support surface and the dashboard.

11. The vehicle of claim 9, wherein the airbag cushion is assigned to two seating places.

* * * * *